(12) United States Patent
Sibiryakov (10) Patent No.: US 9,158,977 B2
(45) Date of Patent: Oct. 13, 2015

(54) METHOD FOR ESTIMATING EGO MOTION OF AN OBJECT

(71) Applicant: Application Solutions (Electronics and Vision) Ltd., Lewes (GB)

(72) Inventor: Alexander Sibiryakov, Lewes (GB)

(73) Assignee: Application Solutions (Electronics and Vision) Ltd., Lewes (GB)

( * ) Notice: Subject to any disclaimer, the term of this patent is extended or adjusted under 35 U.S.C. 154(b) by 0 days.

(21) Appl. No.: 14/460,629

(22) Filed: Aug. 15, 2014

(65) Prior Publication Data
US 2015/0086078 A1    Mar. 26, 2015

(30) Foreign Application Priority Data
Sep. 20, 2013    (EP) .................................. 13185423

(51) Int. Cl.
*G06K 9/00* (2006.01)
*G06T 3/40* (2006.01)
*G06T 7/20* (2006.01)
*G06K 9/62* (2006.01)
*G06T 11/60* (2006.01)

(52) U.S. Cl.
CPC .......... *G06K 9/00791* (2013.01); *G06K 9/6201* (2013.01); *G06T 3/4038* (2013.01); *G06T 7/20* (2013.01); *G06T 7/206* (2013.01); *G06T 7/2013* (2013.01); *G06T 7/2033* (2013.01); *G06T 11/60* (2013.01); *G06T 2207/10016* (2013.01); *G06T 2207/20056* (2013.01); *G06T 2207/20068* (2013.01); *G06T 2207/30252* (2013.01)

(58) Field of Classification Search
USPC ......... 382/103, 104, 107, 128, 154, 190, 218, 382/219; 40/446; 345/108; 340/10.52, 10.1, 340/572.1
See application file for complete search history.

(56) References Cited

U.S. PATENT DOCUMENTS 7,277,080 B2 * 10/2007 Goulthorpe .................... 345/108
7,899,220 B2 *  3/2011 Haex et al. ..................... 382/128
8,847,739 B2 *  9/2014 Wilson et al. ............... 340/10.52

FOREIGN PATENT DOCUMENTS

DE    102011088332    6/2013

OTHER PUBLICATIONS

European Search Report mailed Mar. 17, 2014 for corresponding European Patent Application No. 13185423.4.
Jose Molineros et al, "Monocular Rear-View Obstacle Detection Using Residual Flow," Oct. 7, 2012, pp. 504-514.
Wen-Chung Chang et al, "Vision-based side vehicle detection from a moving vehicle," Jul. 1, 2010, pp. 553-558.

* cited by examiner

*Primary Examiner* — Anh Do
(74) *Attorney, Agent, or Firm* — RatnerPrestia (57) ABSTRACT

A method for estimating ego motion of an object moving on a surface, the method including generating at least two composite top view images of the surface on the basis of video frames provided by at least one onboard video camera of the object moving on the surface; performing a region matching between consecutive top view images to extract global motion parameters of the moving object; calculating the ego motion of the moving object from the extracted global motion parameters of the moving object.

15 Claims, 10 Drawing Sheets

METHOD FOR ESTIMATING EGO MOTION OF AN OBJECT

FIELD OF THE INVENTION

The invention relates to a method and apparatus for estimating ego motion of an object moving on a surface, and in particular to a method for estimating a vehicle ego motion from onboard video cameras.

SUMMARY OF THE INVENTION

The ego motion of an object such as a vehicle is usually represented by an instant rotation matrix and a translation vector, from which other application-specific characteristics of the object such as instant or average speed, total turning angle or predicted wheel trajectories can be computed.

Conventional visual odometry provides motion information of an object from visual observation of image data. This motion information can complement data from other data sources such as speed and steering sensors or GPS systems. Main approaches of conventional video odometry estimation are stereo camera-based structure-from-motion (SfM) or simultaneous localisation and mapping as well as monocular SfM or SLAM as well as direct planar motion estimation.

Conventional stereo-based approaches use a standard computer vision pipeline to recover a camera pose from observed 3D information data. Although with this approach, the information between cameras at different moments of time can be recovered by robust estimation of transformation between 3D point clouds. The stereo-based approach is not suitable for using surround-view cameras with low or none scene overlap or monocular cameras such as standard rear view parking cameras. In such a case, monocular algorithms are usually applied. These monocular algorithms follow a so-called stereo-from-motion approach in which 3D coordinates of scene points are obtained by feature tracking and applying stereo geometry being distributed through time. The unknown variable stereo-calibration, which performs another interpretation of ego motion, results in a scale-free stereo geometry and therefore multi-frame stereo algorithms are used to obtain locally consistent metric 3D structures. Because of the projective nature of the monocular camera, the scene and camera motion can be recovered up to scale. Therefore, severe motion constraints such as loop closure are required to compensate a drift of the motion parameters. However, such constraints are usually not applicable in automotive applications. Other constraints arise from a multi-camera setup requiring visual feature association between cameras, which is unfeasible with low-overlap surround-view camera systems. Another motion constraint can be introduced by a known calibration object in the scene. A widely used calibration object in automotive applications is the road surface. By detecting and tracking the road features and applying planar motion constraints, the monocular SfM or SLAM algorithms are able to provide metric ego motion data. Additional challenges in road feature tracking are low texture information and large scale and distance variations due to an extremely oblique view on the road plane.

Direct planar motion estimation is used in many conventional systems because of the extra difficulty in tracking of high-quality road features. Direct planar motion estimation methods use image registration by warping one frame to another and finding transformation parameters minimizing a pixel error. The image transformation that is used for warping is composed of vehicle ego motion and projective transformation of the road plane. An iterative image difference minimisation algorithm is able to find unknown ego motion even in a common case of low road texture variations, where feature-based methods fail to find a sufficient number of features. Further, a disadvantage of conventional direct planar motion estimation methods results from the use of the whole road area which may be obscured by obstacles or corrupted by moving shadows. In such cases, the performed estimation suffers from a local minima problem and a good initial approximation of parameters is required.

SUMMARY OF THE INVENTION

Accordingly, an aspect of the present invention provides a method and apparatus for estimating ego motion of an object moving on a surface which overcome the above-mentioned disadvantages and which provide a robust and reliable way for estimating ego motion of an object, in particular a vehicle, moving on a surface.

According to a first aspect of the present invention, a method for estimating ego motion of an object moving on a surface is provided, wherein the method comprises: generating at least two composite top view images of the surface on the basis of video frames provided by at least one onboard video camera of said object moving on said surface; performing a region matching between consecutive top view images to extract global motion parameters of the moving object and calculating the ego motion of the moving object from the extracted global motion parameters of the moving object.

According to a first possible embodiment of the method according to the first aspect of the present invention, the region matching between consecutive top view images comprises feature matching.

According to a further possible embodiment of the method according to the first aspect of the present invention, the region matching between consecutive top view images comprises block matching.

In a still further possible embodiment of the method according to the first aspect of the present invention, the top view images are processed by performing a 1D integral transformation to provide 1D integral images used for the region matching.

In a still further possible embodiment of the method according to the first aspect of the present invention, the extracted global motion parameters of the moving object comprise a translation and a rotation of the moving object.

In a still further possible embodiment of the method according to the first aspect of the present invention, a motion of a feature on a top view image is decomposed into a sum of a global translation vector estimated from a large top view region and a local translation vector estimated from a small region around the respective feature.

In a still further possible embodiment of the method according to the first aspect of the present invention, the top view image is formed by a metric top view image of the surface constructed by a regular grid with a predetermined distance between samples on the surface and by projecting each sample into a camera image to obtain a pixel value.

In a still further possible embodiment of the method according to the first aspect of the present invention, global motion parameters are computed from a set of inliers provided by said region matching and selected by an estimator.

In a further possible embodiment of the method according to the first aspect of the present invention, the object is formed by a vehicle moving on a flat surface.

According to a second aspect, the invention provides an apparatus for estimation of ego motion of an object moving on a surface comprising at least one onboard video camera attached to said object adapted to provide video frames of the surface, a generation unit adapted to generate composite top view images of the surface on the basis of video frames, a region matching unit adapted to perform a region matching between consecutive top view images to extract global motion parameters of said moving object, and a calculation unit adapted to calculate the ego motion of the moving object from the extracted global motion parameters of said moving object.

In a possible embodiment of the apparatus according to the second aspect of the present invention, the apparatus further comprises a transformation unit adapted to perform a 1D integral transformation of the top view images to provide 1D integral images stored in a buffer to be used for region matching by said region matching unit.

In a further possible embodiment of the apparatus according to the second aspect of the present invention, the global motion parameters are computed from a set of inliers provided by said region matching performed by said region matching unit and selected by an estimator.

In a possible embodiment of the apparatus according to the second aspect of the present invention, the estimator is a RANSAC estimator.

In a still further possible embodiment of the apparatus according to the second aspect of the present invention, the onboard video cameras are monocular cameras.

The invention further provides according to a third aspect a vehicle comprising the features of claim 14.

According to this aspect of the present invention, a vehicle is provided moveable on a surface comprising an apparatus according to the second aspect of the present invention.

According to a possible embodiment of the vehicle according to the third aspect of the present invention, the vehicle comprises a car or truck moving on a road surface.

In a still further possible embodiment of the vehicle according to the third aspect of the present invention, the vehicle is a robot moving on a flat surface.

BRIEF DESCRIPTION OF THE DRAWINGS

In the following, possible embodiments of the different aspects of the present invention are explained in more detail with reference to the enclosed figures.

DETAILED DESCRIPTION OF THE PREFERRED EMBODIMENTS

Figure 1:
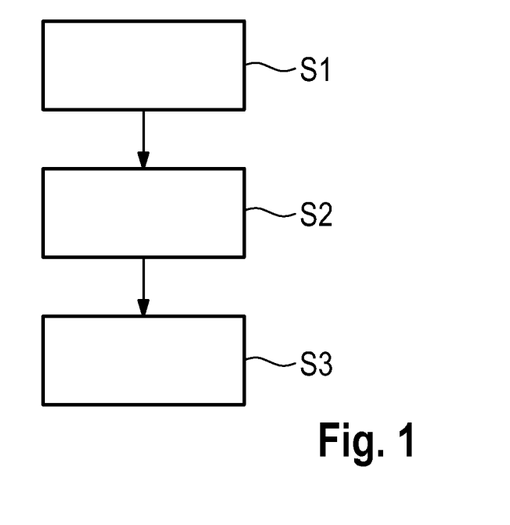
FIG. 1 shows a flow diagram of a possible embodiment of a method for estimating ego motion of an object according to the first aspect of the present invention.

FIG. 1 shows a flowchart of a possible exemplary embodiment of a method for estimating ego motion of an object moving on a surface according to a first aspect of the present invention. As can be seen in FIG. 1, the method comprises several steps. In a first step S1, at least two composite top view images of the surface are generated on the basis of video frames provided by at least one onboard video camera of the object moving on the surface. The moving object can be in a possible embodiment a vehicle moving on a road surface. Further, the moving object can be for example a robot moving on a flat surface. The moving object such as a vehicle or a robot comprises onboard video cameras which generate in step S1 at least two composite top view images of the respective surface.

In a further step S2, a region matching is performed between consecutive top view images to extract global motion parameters of the moving object. In a possible implementation, the extracted global motion parameters of the moving object can comprise a translation and a rotation of the respective moving object. The region matching between consecutive top view images performed in step S2 can comprise in a possible implementation feature matching or block matching.

In a further step S3, the ego motion of the moving object is calculated from the extracted global motion parameters of the moving object.

Figure 2:
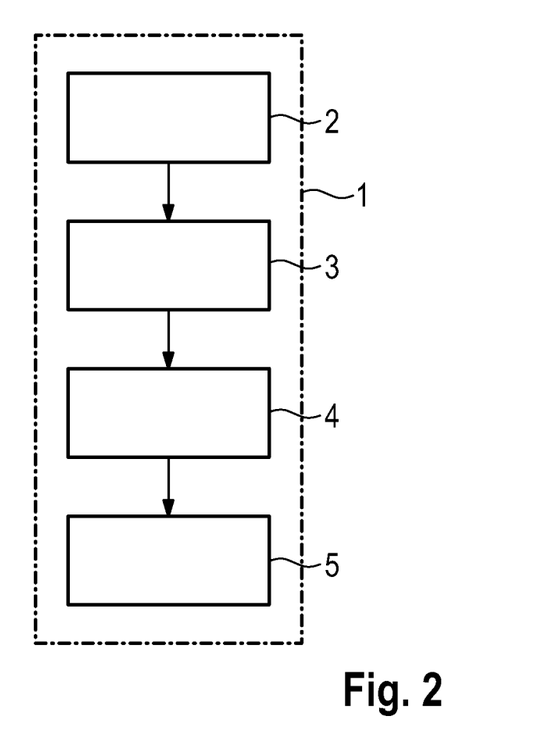
FIG. 2 shows a block diagram of a possible embodiment of an apparatus for estimating ego motion of an object according to the second aspect of the present invention.

FIG. 2 shows a block diagram of a corresponding apparatus 1 according to a second aspect of the present invention. As can be seen in the block diagram of FIG. 2, the apparatus 1 according to the second aspect of the present invention being provided for estimation of ego motion of an object moving on a surface comprises at least one onboard camera 2 attached to said object and adapted to provide video frames of the surface on which the respective object does move. The apparatus 1 further comprises a generation unit 3 adapted to generate composite top view images of the surface on the basis of the received video frames. The apparatus 1 further comprises a region matching unit 4 adapted to perform a region matching between consecutive top view images to extract global motion parameters of the moving object. As can be seen in FIG. 2, the apparatus 1 according to the second aspect of the present invention comprises in the shown embodiment a calculation unit 5 adapted to calculate the ego motion of the moving object from the extracted global motion parameters of the moving object.

Figure 3:
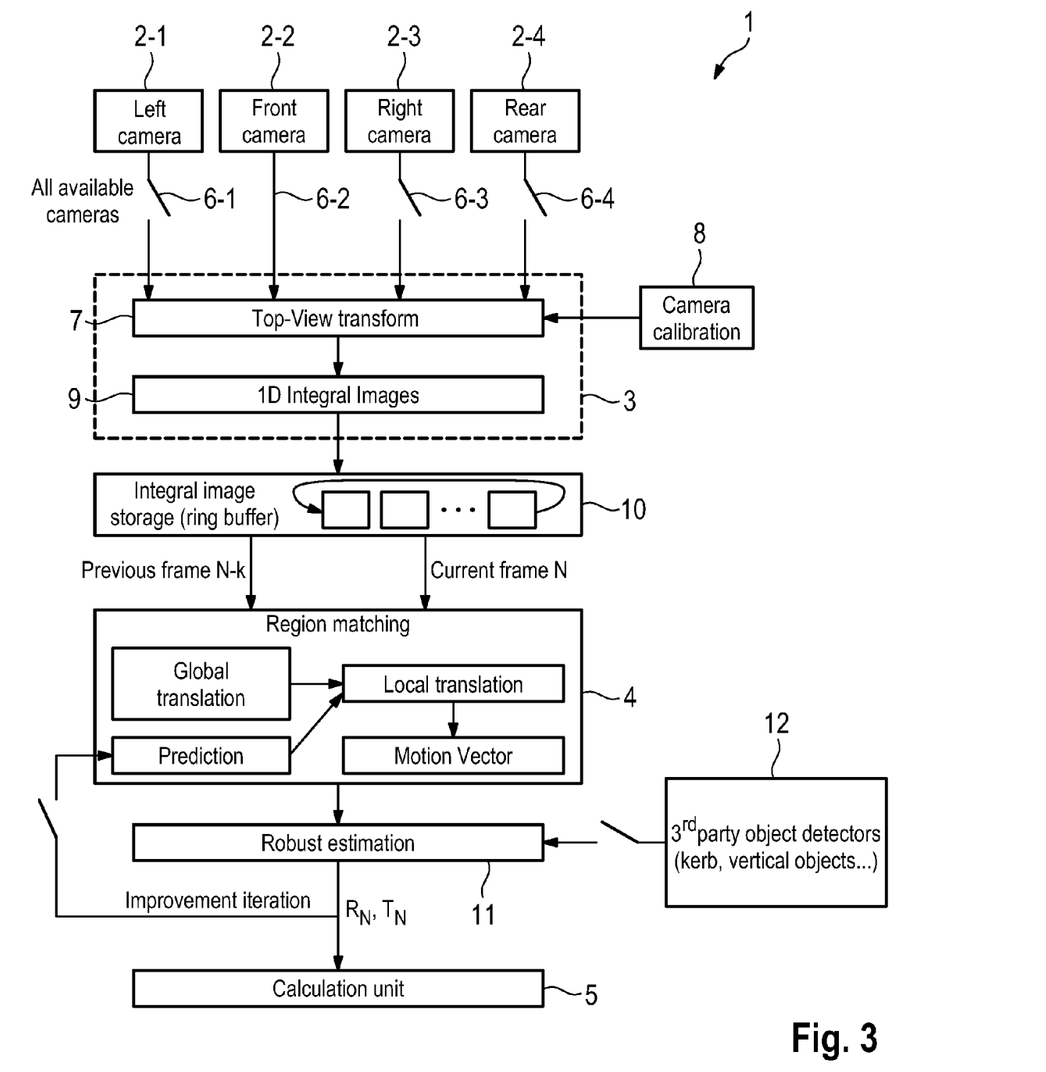
FIG. 3 shows a block diagram of a possible embodiment of an apparatus for estimating ego motion of an object according to the second aspect of the present invention.

FIG. 3 shows a further exemplary embodiment of an apparatus 1 for estimation of ego motion of an object moving on a surface according to the second aspect of the present invention. In the exemplary embodiment of FIG. 3, the apparatus 1 comprises four onboard cameras 2-1, 2-2, 2-3, 2-4 of a surround view system. The number of onboard video cameras 2-$i$ observing the surface in the vicinity of the moving object can vary. Any number of calibrated cameras observing the surface or road in the vicinity of the moving object is suitable. In the embodiment shown in FIG. 3, the onboard video cameras can be switched by means of corresponding switches 6-1, 6-2, 6-3, 6-4 to a top view transformation unit 7 which can be connected to a camera calibration unit 8 as illustrated in FIG. 3. Each onboard video camera 2-$i$ generates its part of a top view image. An overlap between these parts is not required. Therefore, the area with the best image resolution can be selected. The requirement is that each top view part is aligned with a global grid in the surface or road plane. In a possible implementation, the (n,m)-th pixel of the i-th top view part P, does correspond to a 3D point on the road plane or surface plane:

$$P_i(n, m) = \begin{bmatrix} (n_i + n)d \\ (m_i + m)d \\ 0 \end{bmatrix}, n = 0 \ldots N_i - 1, m = 0 \ldots M_i - 1$$

where $(n_i, m_i)$ are integer coordinates of the origin of the top view part, $N_i, M_i$ are dimensions of the top view part, d is the ground resolution of the pixel of the top view image. These 3D points are projected to the ground image using calibration parameters by the following equation, which is described later in detail:

$$p = K_c \left( \begin{bmatrix} R_c & t_c \\ 0 & 1 \end{bmatrix} \begin{bmatrix} P \\ 1 \end{bmatrix} \right)$$

The interpolated pixel value of the projected pixel is assigned to a top view pixel p. In a possible implementation, the parameters can be selected as follows:
d=1 cm
$N_1=N_4=512$; $M_1=M_4=256$;
$N_2=N_3=256$; $M_2=M_3=512$.
The position of the corners $(n_i, m_i)$ centres the camera above the region to provide the best resolution of the image. The constants $N_i$ are selected for the fastest execution of a region matching algorithm via Fast Fourier Transformation, FFT.

In a further possible embodiment, the top view image is created by an existing surround view system as a component of a user interface. In this embodiment, the composite top view image has a rectangular shape and the regions used by the algorithm are taken from composite top view images.

Figure 7:
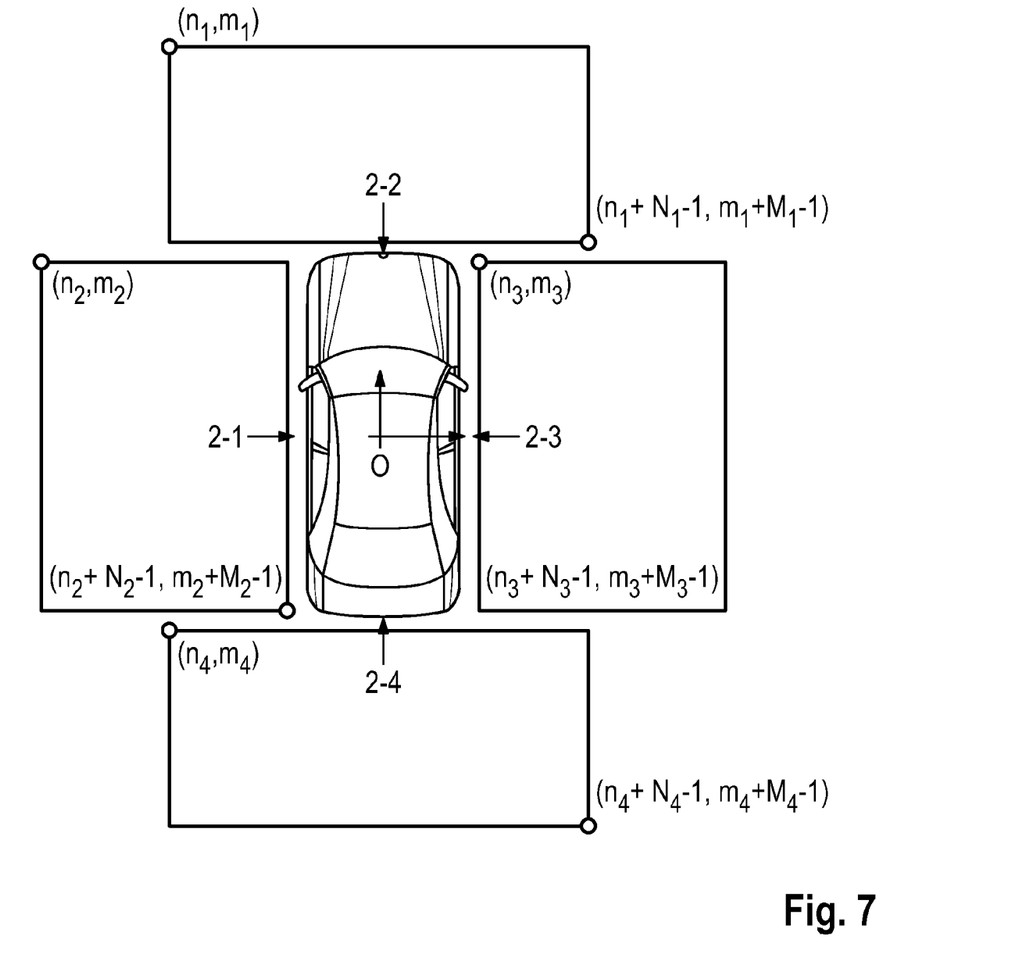
FIG. 7 shows a layout of top view parts from a typical arrangement of surround view cameras for illustrating a possible embodiment of the method and apparatus according to the present invention.

FIG. 7 shows a layout of top view parts from typical arrangements of surround view cameras in a moving car. The black triangles of FIG. 7 show exemplary possible positions of onboard video cameras 2-$i$. The rectangles illustrated in FIG. 7 represent corresponding top view parts.

After generation of the top view images from each onboard video camera 2-$i$, conventional methods can be applied to enhance images to ensure a reliable feature matching. One of these conventional methods is local histogram equalization, but any other corresponding algorithm can be used as well. As illustrated in FIG. 3, the top view transformation unit 7 is connected to a transformation unit 9 which is adapted to perform a 1D integral transformation of the top view images to provide 1D integral images which can be stored in a buffer 10 and can be used for the region matching by the region matching unit 4 of the apparatus 1. A transformation unit 9 performs a processing step to create another representation of the top view image required for a fast feature extraction and matching. In the following, only this representation as a set of 1D integral images is used so that the original top view images can in a possible implementation be discarded. In an alternative embodiment, the integral images can be computed without allocating memory for the top view images. After computing each next pixel of the top view, it can be used in a possible implementation directly to update the integral images as described below.

The 1D integral image is analogue to a conventional 2D integral image. The 1D integral images contain sum in a row or column up to and including a current pixel. The row-wise and column-wise integral images can be defined as:

$$I_r(x, y) = \sum_{a \leq x} f(a, y) = I_r(x-1, y) + f(x, y),$$

$$I_c(x, y) = \sum_{b \leq y} f(x, b) = I_c(x, y-1) + f(x, y)$$

where f(x,y) is an input image, i.e. the top view image, and $I_r(-1,y)=I_c(x,-1)=0$. Similar to its 2D counterpart, the 1D integral images do serve for fast computation of a sum of pixels in a row or column:

$$\sum_{a=x_i}^{x_2} f(a, y) = I_r(x_2, y) - I_r(x_1 - 1, y),$$

$$\sum_{b=y_i}^{y_2} f(x, b) = I_c(x, y_2) - I_c(x, y_1 - 1).$$

In a possible embodiment, the integral images can be stored in an integral image storage 10 which can be formed by a ring buffer of length r so that at each frame n, representations of the previous frames n−1, n−2 ..., n−r+1 can be retrieved for feature matching between frames n and n−k.

The previous frame n−k and the current frame n are supplied to the region matching unit 4 as illustrated in FIG. 3. The region matching unit 4 of the apparatus 1 is adapted to perform a region matching between consecutive top view images to extract global motion parameters of the moving object. The transformation unit 9 performs a 1D integral transformation of the top view images to provide 1D integral images stored in the buffer 10 to be used by the region matching unit 4. In a possible embodiment of the apparatus 1 according to the present invention, global motion parameters are computed from a set of inliers provided by said region matching unit 4 and selected by an estimator 11 connected to the output of the region matching unit 4. In a possible embodiment, the estimator 11 is a RANSAC estimator. The calculation unit 5 of the apparatus 1 is adapted to calculate the ego motion of the moving object from the extracted global motion parameters of the moving object provided by the estimator 11.

In the following, the ego motion estimation strategy as employed by the method and apparatus according to the present invention is described in more detail.

The motion of the top view image is composed of three components comprising a translation due to vehicle motion along its orientation axis, a rotation around an instant rotation axis and a warping due to vertical motion of the vehicle.

Figure 8A:
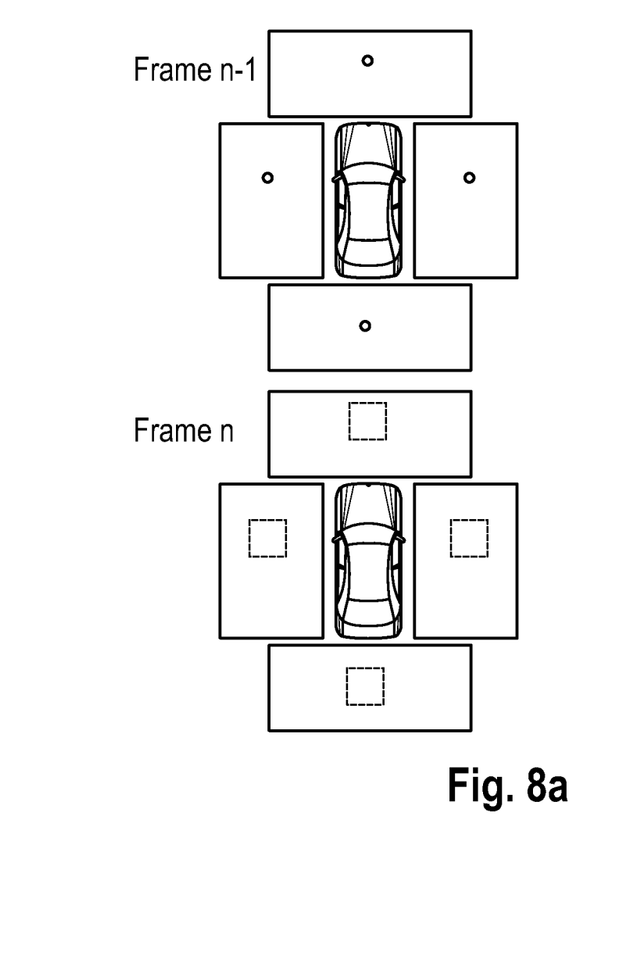
FIGS. 8a and 8b show diagrams for illustrating feature matching as performed by a method and apparatus according to a possible embodiment of the present invention.
Figure 8B:
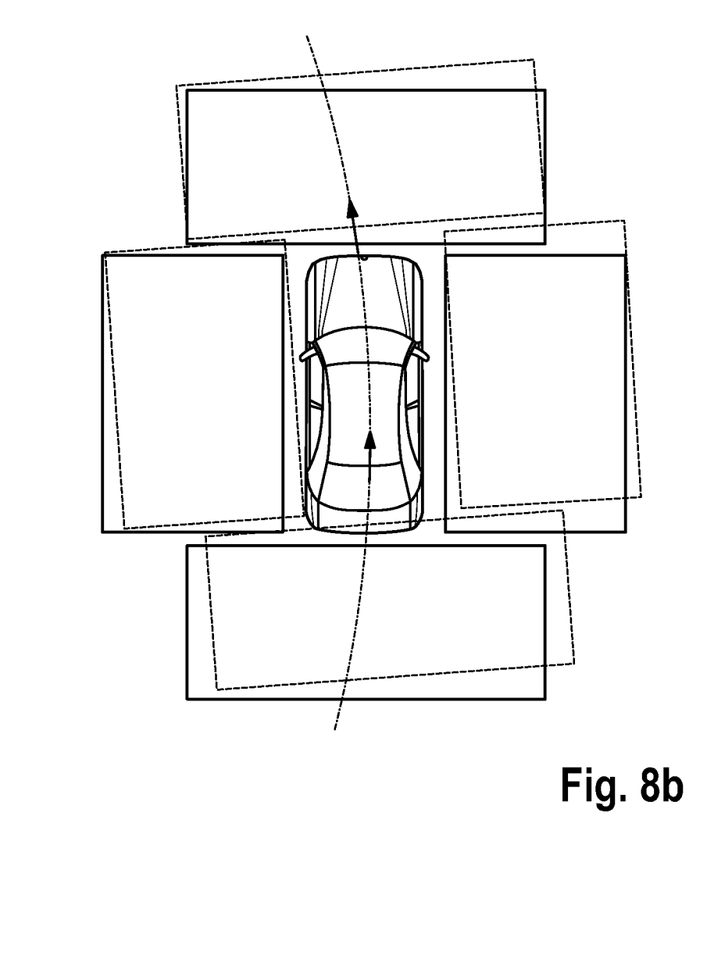

With the method and apparatus according to the present invention, the planar motion of the vehicle is considered that the warping component of the motion can be neglected. The planar motion of a turning vehicle can be described as a circular motion around an instantaneous centre of rotation as illustrated in FIG. 8b. A straight motion of the vehicle can also be interpreted as a circular motion with an infinite radius. During a circular motion of a vehicle, the different top view parts rotate around the instantaneous centre of rotation and travel different distances, e.g. the outside part does travel more than the inside part as illustrated in FIG. 8. Using common parameters for feature/block matching algorithms do in these cases result in many false local motion vectors. For example, by considering a large search area for an inside part which does not move too far (left region in FIG. 8b), the features/blocks have to be matched to more candidates which does increase the probability of a false matching.

FIG. 8a shows top view images corresponding to different moments of times (frames n−1 and n). To find features from frame n−1 (shown in FIG. 8a by circles) in frame n without a priori knowledge of ego motion, large search areas should be used (shown by dashed rectangles in FIG. 8a).

FIG. 8b shows a planar motion of the top view regions for turning a vehicle. Solid and dashed rectangles show initial and new positions of the top view regions, respectively. The different top view regions travel different distances. Therefore, to exclude potential false matches, the search area for feature matching can be adjusted in a possible embodiment individually for each top view region.

To address speed and accuracy issues, the method and apparatus according to the present invention uses in a possible embodiment a region matching approach having the following components. One component is the use of independent regions, i.e. the motion of each top view part is approximated independently (as shown in FIG. 8a) so that a short-moving part does not restrict the far-moving part and vice versa. A further component of the region matching approach is the use of a coarse-to-fine matching approach. First, a dominant translation is computed using the entire top view part (as shown in FIG. 8) and then local motion vectors are iteratively refined using smaller blocks as illustrated in FIG. 11. A further component of the region matching approach is the use of block matching. Predetermined locations are used as feature positions and a rectangular image patch is used to compute an integral descriptor to avoid more computationally expensive interest point-based feature extraction algorithms. Finally, the region matching approach uses a restricted search region. A small search area equal to a block size is used to avoid possible false matches as illustrated in FIG. 8b and FIG. 11.

Figure 9A:
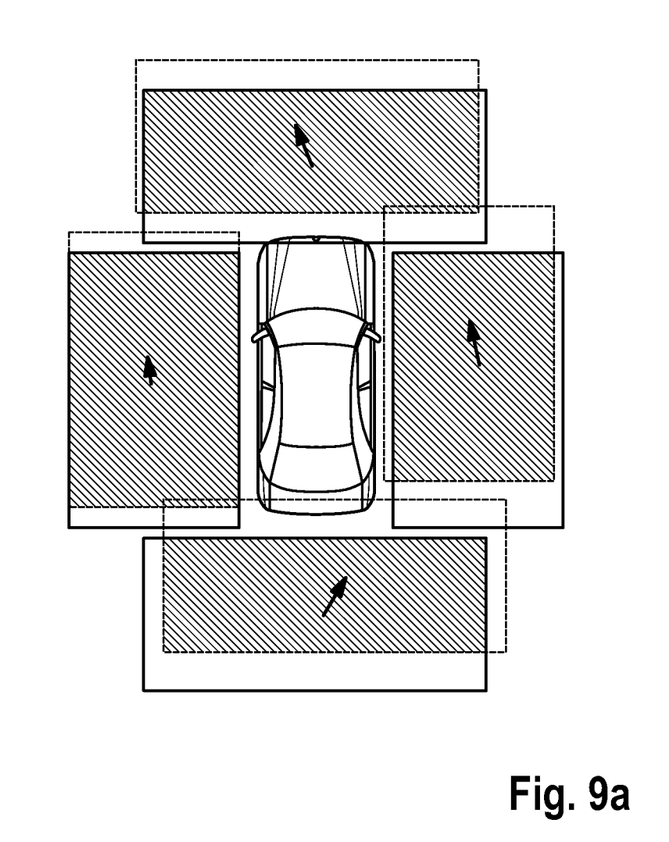
FIGS. 9a and 9b show diagrams for illustrating an approximation of a top view region motion by dominant translation as performed by a possible embodiment of the apparatus and method according to the present invention.
Figure 9B:
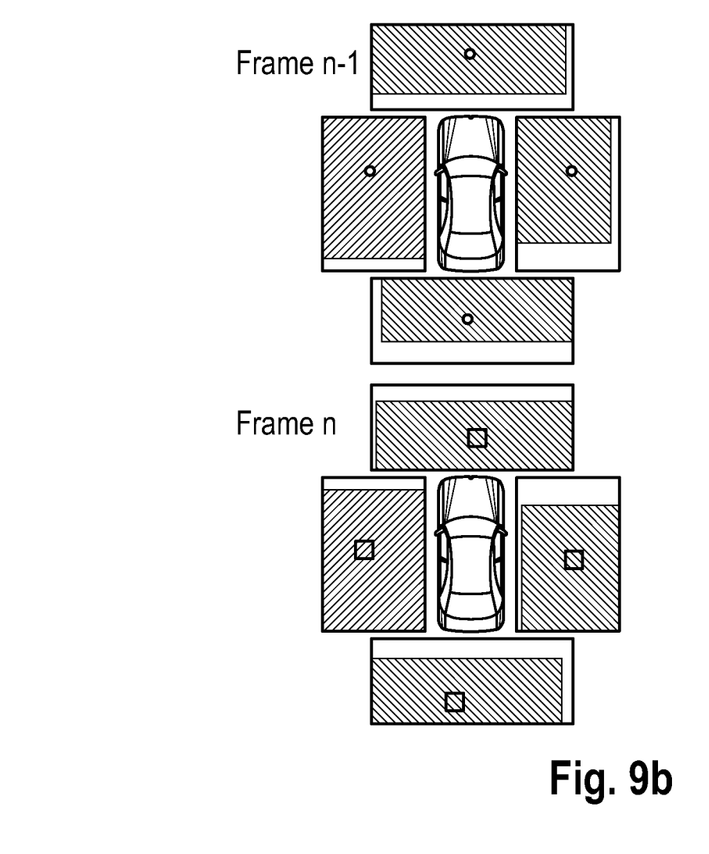

FIGS. 9a, 9b illustrate the approximation of a top view region motion by a dominant translation. As can be seen in FIG. 9b, an unknown motion of each region in frame n−1 (solid rectangle) is approximated by a translation (illustrated as an arrow) so that the position of the region in the next frame n is roughly known as illustrated by the dashed rectangles in the coordinate system of frame n−1. An overlap area (grey rectangle) contains features that are in view in both frames.

As shown in FIG. 9b, the location of features (shown by circles) from frame n−1 is roughly known in frame n using the dominant translation. A smaller search area (thick rectangle in FIG. 9b) compared to FIG. 8a is required to match features accurately. Only features from the overlap regions (grey rectangles) are considered.

In a possible implementation, a phase correlation method is employed to perform block matching. The efficiency of projection-based translational motion estimation in video has been widely demonstrated. Reliable results are provided even when images are blurred due to rapid camera motion and when independent local motions are presented. For example, for an image f(x,y) of an image size N×M, the 1D projections can be computed as follows:

$$X(x) = \sum_{y=0}^{M-1} f(x,y); \quad Y(y) = \sum_{x=0}^{N-1} f(x,y)$$

The component of the translation vector between images $f_1$ and $f_2$ can be obtained independently as shifts between corresponding projections. Such a shift $\Delta x$ between $X_1(x)$ and $X_2(x)$ can be computed in a possible embodiment via a 1D variant of a phase correlation method PCM. The phase correlation method PCM is derived under the assumption that $X_1(x)=X_2(x+\Delta x)$ using a shift theorem of the Fourier transform. The phase correlation method PCM can compute the unknown shift between signals as:

$$\Delta x = \mathrm{argmax} IFFT\left(\frac{FFT(w(X_1))FFT*(w(X_2))}{|FFT(w(X_1))FFT*(w(X_2))|}\right)$$

wherein FFT and IFFT are the forward and inverse Fourier transforms, * is a complex conjugation and w(X) is a signal windowing that is usually applied to reduce frequency artifacts due to non-periodic signals. All operations on signals, namely multiplication, division and taking the magnitude, can be performed sample-wise. The other shift component $\Delta y$ can be determined similarly using the other pair of projections, $Y_1(y)$ and $Y_2(y)$.

Figure 10:
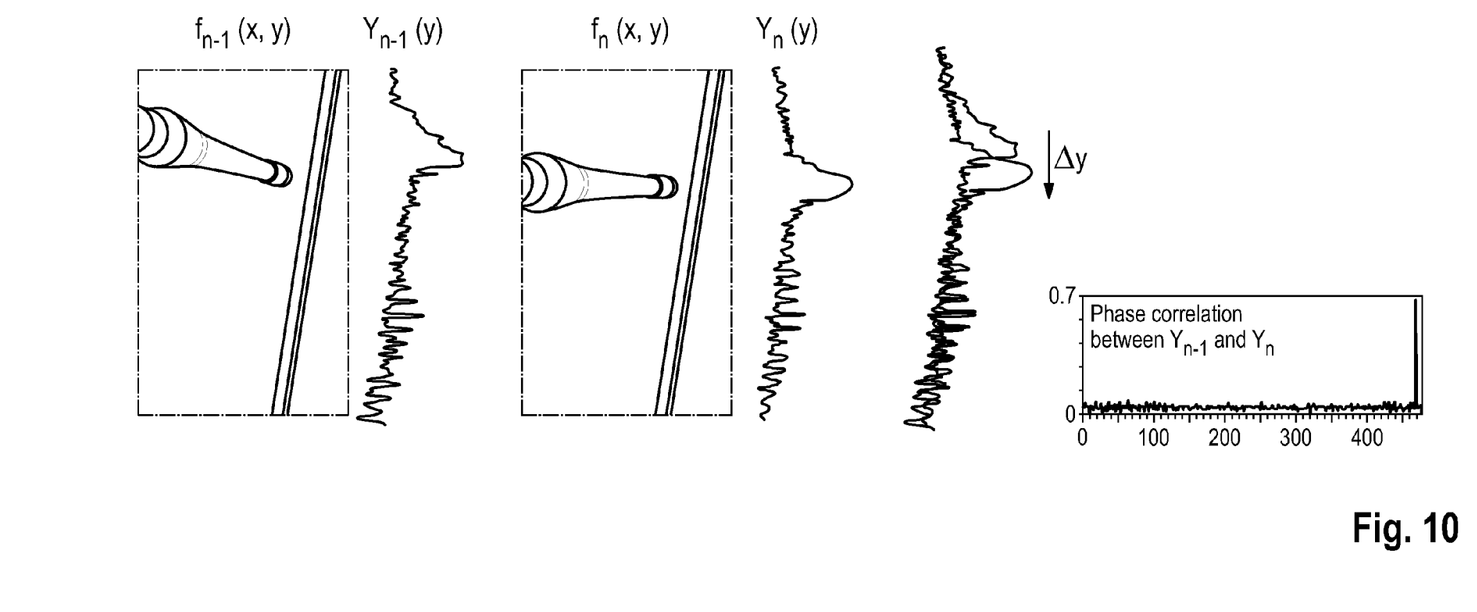
FIG. 10 shows diagrams for illustrating shift estimation between top view regions taken at different moments of time in a possible embodiment of the method and apparatus according to the present invention.

FIG. 10 illustrates shift estimation between top view regions taking at different moments of time. $f_{n-1}$ and $f_n$ are top view images corresponding to video frames n−1 and n. $Y_{n-1}$ and $Y_n$ are their projections, for example vertical projections. As can be seen in FIG. 10 on the right, the shift between the projections is detected from location of global maximum of their phase correlation. The same method can be used for both global and local region matching. In a possible embodiment of the method and apparatus according to the present invention, the phase correlation method PCM can be extended by using integral images so that the projections can be efficiently computed as:

$$X(x)=I_c(x,M-1)-I_c(x,-1), \; Y(y)=I_r(N-1,y)-I_r(-1,y)$$

Similarly, for a rectangular block of pixels g(x,y), $0 \leq x_1 \leq x \leq x_2 \leq N-1$, $0 \leq y_1 \leq y \leq y_2 \leq M-1$:

$$X(x)=I_c(x,y_2)-I_c(x,y_1-1), \; Y(y)=I_r(x_2,y)-I_r(x_1-1,y)$$

Another modification of the phase correlation method PCM results from equivalent representation of the above equation:

$$\Delta x = \arg \max \mathrm{IFFT}(D(X_1)D^*(X_2))$$

where D(X) and D(Y) are block descriptors representing a normalized Fourier transform of the block projection:

$$D(X) = \frac{FFT(w(X))}{|FFT(w(X))|}$$

An advantage of these block descriptors is their re-use in future computations. If oncoming signals $X_1, X_2, X_3$ are to be matched, their descriptors $D(X_1)$, $D(X_2)$ and $D(X_3)$, ... can be computed once and stored in the ring buffer 10 shown in FIG. 3. To compute the shift values, the block descriptors can be retrieved from the buffer 10, thus saving one Fourier transform and its normalization comparing to a conventional straightforward approach.

The block matching used by the phase correlation method PCM does not require any search strategy. For a particular block $g_1$, only a single block $g_2$ is used, thus restricting the range of the shift values by the block sizes. In order to be able to compute local motion vectors without such restrictions, the method and apparatus according to the present invention use in a possible embodiment a coarse-to-fine strategy. First, a dominant translation is computed using the entire top view region, and then local motion vectors are iteratively refined using smaller blocks as illustrated in FIGS. 9 and 11.

In a preferred fastest implementation of the method and apparatus according to the present invention, only one refinement iteration is used with the small non-overlapping blocks, for instance 32×32 pixels. This approach also results from non-holonomic motion constraints meaning that instant vehicle translation is aligned with its orientation.

Figure 11A:
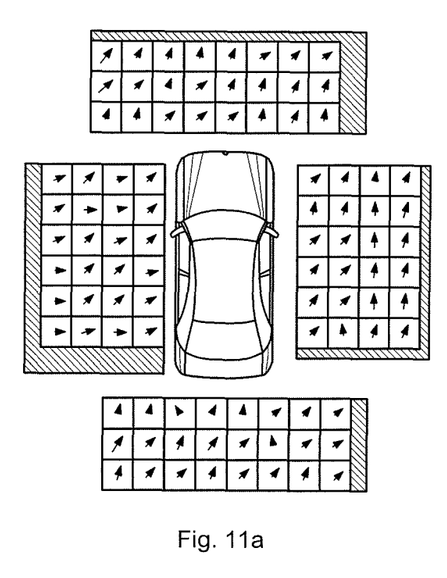
FIGS. 11a and 11b show diagrams for illustrating a local motion vector computation as performed in a possible embodiment of the method and apparatus according to the present invention.
Figure 11B:
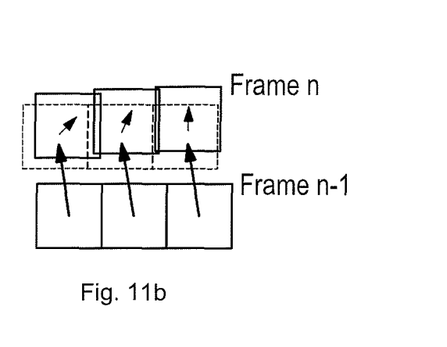

FIGS. 11a, 11b illustrate a local motion vector computation as performed by the region matching unit 4 of the apparatus 1 according to the present invention. As can be seen in FIG. 11b, an overlap region (grey rectangles) can be divided in a regular grid of blocks. Due to global translation compensation, the corresponding blocks can already be aligned in frame n−1 and n. An estimation of local translation within the block finalises the computation of the motion vector.

As can be seen in FIG. 11b, the final motion vector is a sum of global and local motion vectors. A global vector gives translation of the overlap region so that all blocks from frame n−1 (solid rectangles in regular grid) are moved by the same vector to the new positions (dashed rectangle). Local translation moves blocks from predicted positions to real positions in frame n (solid rectangles in non-regular grid).

The dominant translation determines a rectangular area of overlap and the local motion vectors are computed only inside this area. The method and apparatus according to the present invention use a regular grid of blocks located in the area of overlap as illustrated in FIG. 11, thus ensuring that the whole area contributes to the motion estimation process. Non-informative blocks from uniform image regions usually result in erroneous motion vectors. Projection of such a block in a constant signal (up to noise) can be detected and filtered out using a simple threshold criterion:

$$\max_x\{X(x)\} - \min_x\{X(x)\} < tM \text{ or } \max_y\{Y(y)\} - \min_y\{Y(y)\} < tN$$

where t is a threshold value.

Figure 4:
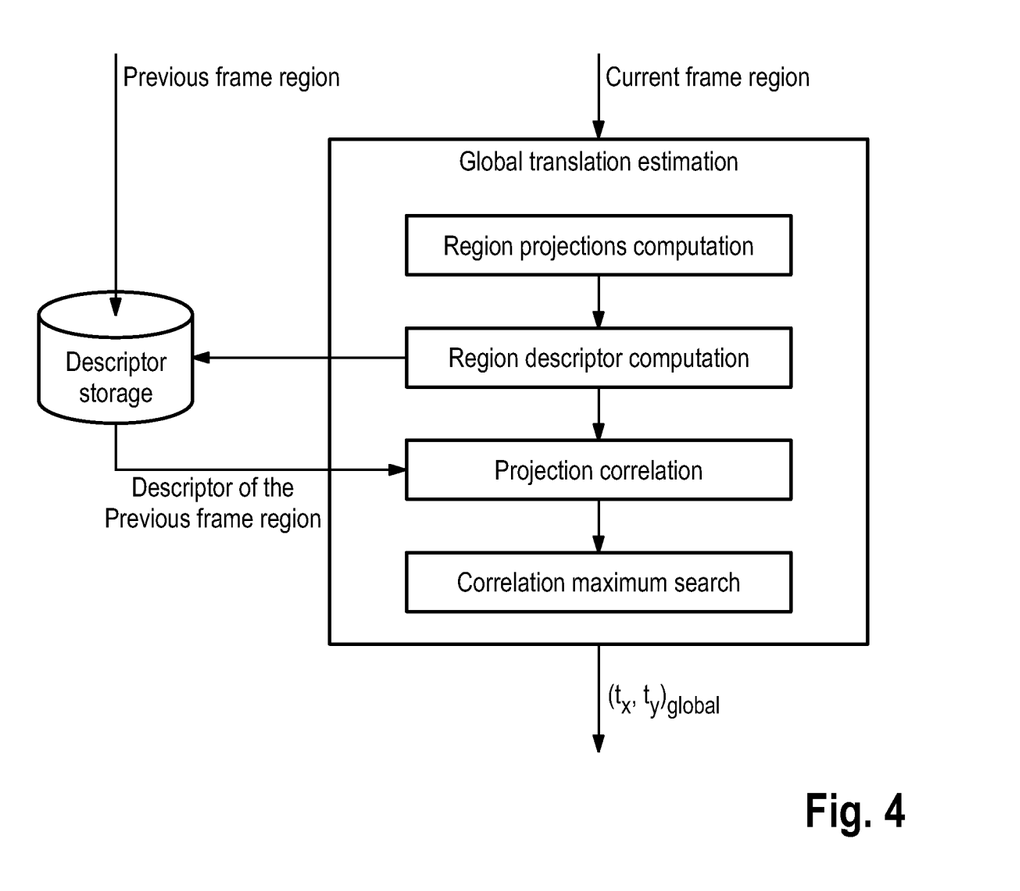
FIG. 4 shows a diagram for illustrating a global translation estimation block within the embodiment of the apparatus shown in FIG. 3.

FIG. 4 shows a block diagram of a possible embodiment of a global translation estimation block within the region matching unit 4 of the apparatus 1 according to the present invention. In the shown embodiment, the global translation estimation block has access to a descriptor storage storing block descriptors D. The global translation estimation block as illustrated in FIG. 4 is adapted to perform region projections computation and a region descriptor computation and the block descriptors are then stored in the descriptor storage as illustrated in FIG. 4. After a projection correlation, a correlation maximum search is performed.

Figure 5:
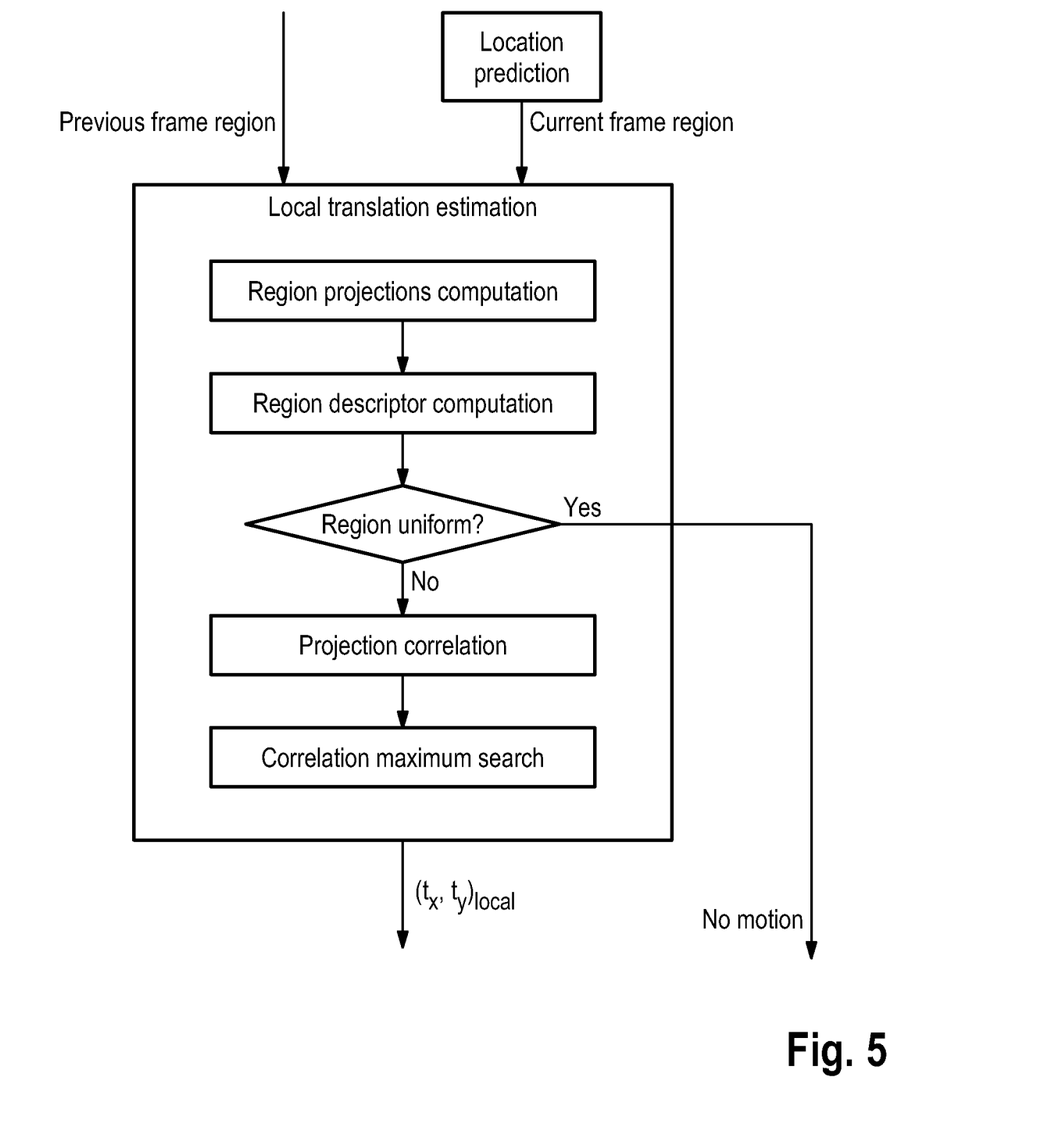
FIG. 5 shows a diagram for illustrating the local translation estimation block within the embodiment shown in FIG. 3.

FIG. 5 shows a block diagram of a possible embodiment of the local translation estimation block with the region matching unit 4 of the apparatus according to the present invention. As can be seen in FIG. 5, first, a region projections computation is performed and then a region descriptor is computed. Then, it is checked whether the respective region is uniform. If the respective region is not uniform, a projection correlation is performed followed by a correlation maximum search. If the respective region is uniform as detected there is no motion.

After extracting motion vectors independently from each available top view part, all vectors are used to recover a global motion. The motion vectors usually include outliers due to independently moving objects or because of unreliable block matching. An outlier can for example be caused by a pole standing at the side of the road. A conventional way to recover global motion in the video is a robust fitting of a motion model to the respective motion vectors. In a possible embodiment of the method and apparatus according to the present invention, two ego motion models can be used comprising a pure translation model and a rotation translation model. With the method and apparatus according to the present invention, the one model that maximizes the number of inliers can be selected as the final result. In a possible embodiment, the RANSAC estimator 11 shown in FIG. 3 can select effectively inliers consistent with motion parameters computed from randomly sampled vectors. The smallest sample size can be used for each motion model, i.e. one vector for pure translation and two vectors for rotation-translation.

Because a planar motion model is used and the road plane is located at a known distance and orientation, the used model fitting algorithm may not recognise large outlier objects. In these cases, the model is fitted to both road and non-road motion vectors which in turn can distort the output parameters of ego motion. An example of such a situation can be the presence of a kerb and pedestrian walk that is above the road surface. The larger motion vectors from the pedestrian walk are concentrated on one side of the top view image which can also be interpreted as rotational motion similar to FIG. 8b. The RANSAC estimator 11 can overfit the motion vectors and output a larger rotation component. In a possible embodiment, the out-of-model objects are detected explicitly and their motion vectors are excluded from the motion estimation. For example, a kerb detection can be performed by an applied algorithm. For example, if a moving object such as a vehicle is moving along a straight line, but the estimated ego motion deviates due to the presence of a kerb, larger motion vectors on the pedestrian walk can be interpreted as a rotational motion. The kerb area can be excluded from processing by turning off the corresponding onboard video camera 2. An accurate ego motion can be extracted from all onboard video cameras 2. In a possible embodiment, the kerb can be automatically detected by a corresponding system and its area excluded from the ego motion computation.

In a possible implementation, a dominant translation between the top view parts can be computed using the phase correlation method PCM, for instance by the global translation block within the region matching unit 4 of the apparatus 1 illustrated in FIG. 3. This computation step can involve for each pair of top view regions that for a current frame n projections are computed on the entire region using integral images. Then, a region descriptor can be computed and stored by the global translation estimation unit for future use. A region descriptor of the previous frame n−1 can be retrieved and phase correlation between region projections can be performed by the global translation estimation unit. Finally, a position of the phase correlation curve can be searched to obtain horizontal and vertical shifts between regions.

Informative blocks from the overlap area are selected and local motion vectors are computed using PCM. Motion vectors with a low phase correlation score are rejected by the local translation block of the region matching unit 4. This procedure as also illustrated in FIG. 5 is similar to a global translation estimation as illustrated in FIG. 4 with the additional step of informative block selection where it is checked whether the region is uniform.

The global translation of the top view part is summed up with local motion vectors to obtain final motion vectors. The RANSAC estimator 11 performs an estimation to motion vectors from all available top view parts and does detect outliers. The estimator 11 performs an estimation of the global motion parameters using all RANSAC inliers.

In a possible optional implementation one can include input from other detectors such as kerb hypothesis or vertical object position to exclude motion vectors from a non-road area. In these possible embodiments, detectors 12 are provided as illustrated in FIG. 3. Further, in a possible optional implementation, global motion transformation can be applied to re-estimate the overlap area between top view parts. This can be performed by a prediction block within the region matching unit 4 as illustrated in FIG. 3. After recovering a matrix of planar motion of the top view image, its inverse represents the ego motion of the moving object.

The method and apparatus according to the different aspects of the present invention can estimate metric parameters of 2D transformation between two nearby object positions using video frames captured by onboard cameras 2-$i$ at those positions. The method and apparatus according to the present invention have the advantage that they provide a reliable fast estimation without occupying too much computer calculation resources.

In a possible embodiment, the onboard video cameras 2-$i$ are monocular cameras. Accordingly, the method of the present invention allows using monocular cameras instead of more expensive stereo rigs. In a possible embodiment, the method and apparatus according to the present invention provide metric ego motion parameters from only two video frames, thus avoiding using computationally expensive multi-frame SfM or SLAM algorithms for estimation of local translation scale and global model scale.

The method and apparatus according to the present invention do not use direct image registration, thus avoiding a computationally expensive scheme of iterative image warping.

Furthermore, the method and apparatus according to the present invention allow the use of any number of available cameras, thus improving the quality of estimated parameters by fusing visual data from different directions. There is no requirement that there is an overlap area between the camera views of the different onboard cameras 2-$i$. Accordingly, any existing surround view camera system already fitted to the respective moving object can be employed.

With the method and apparatus according to the present it is assumed that the equation of the road plane or surface is known in the vicinity of the moving object in the system of coordinates of each onboard camera. This means that any 3D point P=(X,Y,Z) on the surface can be projected to the camera sensor plane to obtain its pixel coordinates p=(x,y). This can be achieved in a possible embodiment by extrinsic and/or intrinsic calibration of the onboard video camera:

$$p = K_c \left( \begin{bmatrix} R_c & t_c \\ 0 & 1 \end{bmatrix} \begin{bmatrix} P \\ 1 \end{bmatrix} \right)$$

where $R_c$ is a 3×3 matrix of rotation of the camera sensor plane with respect to the road plane, $t_c$ is a translation of the camera centre with respect to the origin of the vehicle coordinate system and $K_c$ is an intrinsic calibration function that maps a ray from the camera centre to a pixel in this sensor. In case of a pinhole camera, it is a multiplication with an upper triangular matrix. In case of a fisheye camera, it is a non-linear polynomial function.

In a possible embodiment, in vehicle applications, it is convenient to perform calibration of the cameras 2-$i$ with respect to a horizontal road plane Z=0. During driving, this condition holds under the vehicle and in its immediate vicinity, therefore such road parts are observable by the cameras 2-$i$. This can be achieved in a possible embodiment either by downward-looking cameras (e.g. a standard rear view parking camera) or by surround view fisheye cameras with a wide angle of view.

With the method and apparatus according to the present invention, it is assumed that the motion of the object is planar. Thus, the vertical component of the motion is not modelled and not estimated. This assumption excludes effects of suspension of road ridges (speed bumps) from the used model. By excluding vertical 3D coordinates, the output of the method is represented by 2D transformation $T_k$ between two positions $P_{k-1}$ and $P_k$:

$$P_k = T_K P_{K-1}$$

where $P_k = [X_k\ Y_k\ 1]^T$ in uniform coordinates, the transformation matrix $T_k$ is composed of 2D rotation $R_k$ and translation $t_k$:

$$T_k = \begin{bmatrix} R_k & t_k \\ 0 & 1 \end{bmatrix}, R_k = \begin{bmatrix} \cos\alpha_k & \sin\alpha_k \\ -\sin\alpha_k & \cos\alpha_k \end{bmatrix}, t_k = \begin{bmatrix} t_x \\ t_y \end{bmatrix}_k$$

In this representation, the position $P_k$ can be given in the local coordinate system of the position $P_{k-1}$. Similar transformation given between any two positions $P_{k-m}$ and $P_k$:

$$P_k = T_{km} P_{k-m}, \text{ where } T_{km} = T_k T_{k-1} \ldots T_{k-m+1}$$

Figure 6:
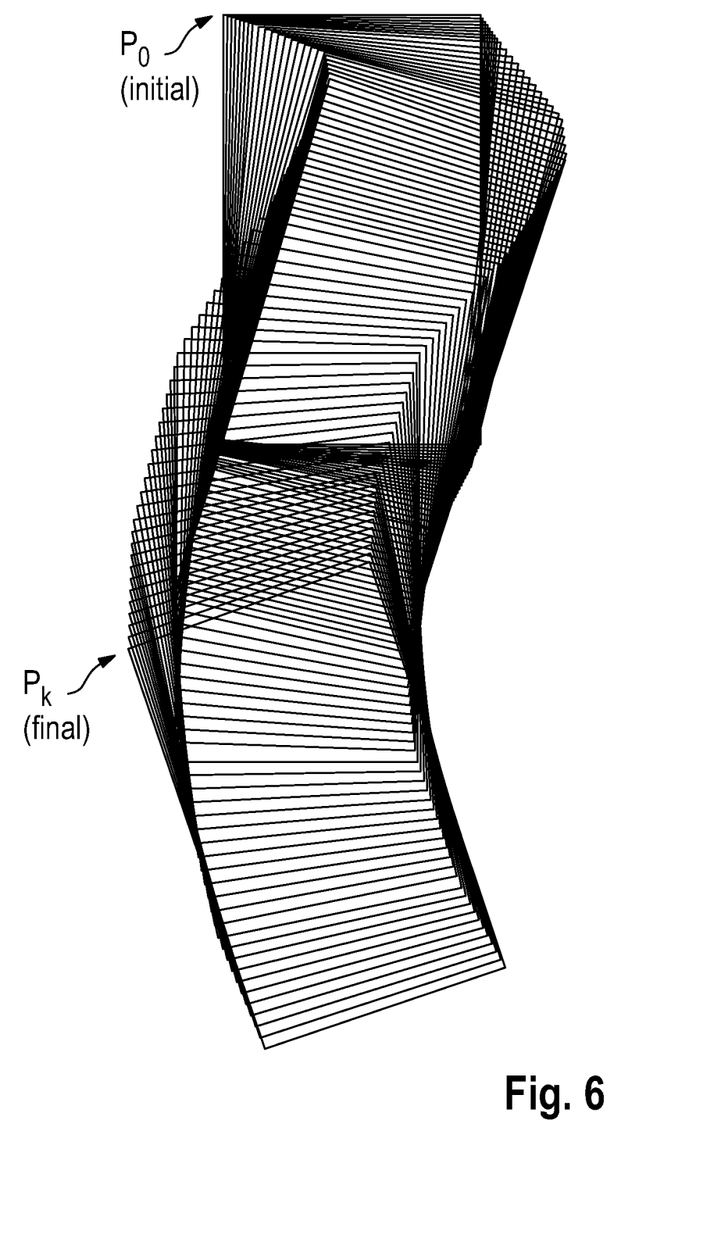
FIG. 6 shows a diagram for illustrating an example of an estimated ego motion provided by the method according to the present invention during a parking manoeuvre.

During vehicle motion, these positions from the metric trajectory of the vehicle point $P_0$ is given in the local coordinate system of the moving object (vehicle). FIG. 6 shows an example of an estimated ego motion with the method according to the present invention during a parking manoeuvre of a vehicle. In FIG. 6, the vehicle outline is shown by a rectangle using top view projection. The initial vehicle rectangle $P_0$ is transformed by the composed ego motion matrix $T_{k,k-1}$. There are conventional methods to compute parametric transformation on one frame to another frame. A difference between this conventional methods and the method according to the present invention is that the conventional methods do not provide metric information of camera motion. Conventional methods compute only motion of pixel fields. With the conventional direct motion model fitting method, motion parameters are iteratively refined by minimizing an overall error between images. These conventional methods are computationally expensive. Moreover, they usually suffer from a local minima problem so that a good initial approximation of parameters is required.

Methods based on local motion can also be divided in two classes, i.e. feature matching and block matching. Feature matching is based on interest point extraction and establishing a correspondence between two point sets. Usually, the largest correlation coefficient between image windows centred at interest points determines the feature correspondences and local motion vectors.

In contrast, block matching is based on dividing video frames into small equal blocks. The best-matched block from one frame is searched from each block from the other frame within a search window.

An embodiment of the present invention uses a PCM-based block matching method because of its computational efficiency. Alternative embodiments may use feature matching methods or combination of block and feature matching methods.

The main issues of local motion vector based motion estimation methods are speed, robustness and accuracy. The number of motion vectors can be in the order of several hundreds. Therefore, an efficient implementation is required for real time performance which provides sufficient speed for the estimation method. Further, the set of motion vectors usually contains a number of outliers due to independently moving objects or unreliable matching.

They are inconsistent with global motion and consequently they have to be identified by a robust estimator such as a RANSAC estimator 11 before computing the motion parameters to increase the robustness of the method.

If all motion vectors are close together, small errors are extrapolated more than if the errors are spread over a larger distance. Therefore, full image coverage by motion vectors is required for an accurate estimation of the motion parameters.

The ego motion of a moving object such as a vehicle is the inverted motion of the surface beneath the moving object. The motion of the surface under the moving object can be estimated on the road parts that are near to the moving object and visible to the available onboard cameras 2 of the moving object.

With the method according to the present invention, the metric motion parameters are recovered from a specially constructed metric image of the surface. This metric image, also referred as a top view, is constructed in a possible embodiment by creating a regular grid with a known world distance between samples on the respective surface and then projecting each sample into the camera image to obtain a pixel value.

Feature matching between consecutive top view images does provide multiple hypotheses of road motion or surface motion. Some of the hypotheses are correct (inliers), and the others are incorrect (outliers). The outliers usually result from independently moving objects and unreliable feature matches. The accurate parameters of surface motion, namely translation and rotation, can be computed in a possible embodiment from the set of inliers selected by a standard robust estimator, preferably by a RANSAC estimator.

In a possible embodiment, exploring non-holonomic motion constraints (meaning that instant vehicle translation is aligned with its orientation) the motion of a local feature on top view image can be decomposed into the sum of a global translation vector, estimated from a large top view region, and a local translation vector, estimated from a small region around the feature, so that the small regions in different frames are aligned by an estimated global translation. Thus, more computationally expensive feature matching under image translation and rotation is replaced with the method according to the present invention by a two-step translation estimation. Further, this scheme resembles properties of two opposite approaches, i.e. direct motion estimation from the large area using all available information and feature-based estimation with avoiding possible non-road objects.

Both the global and local translation estimators used by the present invention do differ only by input region size so that the same estimation principle can be used. To enable a fast estimation of translation between large regions, in a possible embodiment, a method based on image projections is preferred. A 2D image region is reduced to two 1D projections comprising a vertical projection and a horizontal projection, wherein each projection is a sum of region's pixels along its rows and columns, respectively. The 2D translation between regions is estimated as independent translations between their 1D projections. Preferably, a shift between 1D projections is computed by a 1D phase correlation method PCM. The above-explained implementation replaces the task of a 2D image matching by two tasks of 1D signal matching, thus significantly reducing the number of necessary calculation operations from $O(NM\log(N \times M))$ to $O(N\log(N))$ and $O(M\log(M))$, where N,M are image sizes.

To enable a fast computation of region projections, original top view images are pre-processed in a possible embodiment by a 1D integral transformation unit 9 resulting in two integral images comprising a vertical and horizontal image so that each pixel of the horizontal integral image is a sum of all pixels in the row up to a current one. Similarly, each pixel of the vertical integral image is a sum of all pixels in the column up to a current one. From the integral images, the region projections are computed from only region boundary pixels, thus significantly reducing the number of necessary calculation operations.

In a possible embodiment, optionally, to pre-filter out unreliable matches, the uniform regions can be excluded from the process by computing a minimum and maximum value in region projections and checking if the absolute difference between these values is less than a threshold.

Moreover, in a possible optional embodiment, the road motion can be iteratively improved by applying the non-holonomic motion constraint exploration with replacing the global translation estimation by applying an already estimated full motion model. The reason for applying the iterative procedure is the possibility to increase the number of inliers due to the use of a more accurate motion approximation instead of a global translation. The increased number of inliers does result in more accurate motion estimation.

In a further possible implementation, to further improve the accuracy, non-road regions can be excluded from the analysis by taking output of other computer vision algorithms such as a kerb detector or a vertical object detector.

The method and apparatus according to the present invention provides as an advantage a metric ego motion from at least two frames. The method and apparatus is suitable for integration into processing pipeline of an existing surround view system. Such conventional systems have already top view image representation as a component of the user interface. Accordingly, the method of the present invention can be run on existing user view image and add more visual information to the driver, e.g. an extrapolated vehicle trajectory. The method according to the present invention can be implemented by means of computation means with low complexity and resources due to the reduced computational complexity which is achieved by transforming image matching operations from computationally expensive 2D domain to a set of 1D domains, wherein 1D algorithms take only a small fraction of the time required by standard and widely used 2D algorithms, using fixed image transformations and using fast signal matching algorithms in the frequency domain. By using fixed image transformations, the top view projection of each pixel is computed in the initialization step and does not change during the execution of the algorithm. Projections of all pixels can be stored in a look-up table in a fixed point format. During an online execution, a fast integer-only algorithm is used to retrieve projected coordinates and compute a top view transform. By using fast signal matching algorithms in the frequency domain, the signal lengths can be adjusted to be a power of two for the fastest execution of a Fourier transformation.

The method and apparatus according to the present invention can be used for estimation of ego motion of any object moving on a surface, in particular a vehicle or a robot moving on a flat surface.

The invention claimed is:

1. A method for estimating ego motion of an object moving on a surface, the method comprising:
(a) generating, by a generation unit of an apparatus onboard the object, at least two composite top view images of the surface on the basis of video frames provided by at least one onboard video camera of said object moving on said surface;
(b) performing, by a region matching unit of the apparatus onboard the object, a region matching between consecutive top view images to extract global motion parameters of said moving object;
(c) calculating, by a calculation unit of the apparatus onboard the object, the ego motion of said moving object from the extracted global motion parameters of said moving object.

2. The method according to claim 1, wherein said region matching between consecutive top view images comprises feature matching or block matching by the region matching unit of the apparatus onboard the object.

3. The method according to claim 1, wherein the top view images are processed, by the generation unit of the apparatus onboard the object, by performing a 1D integral transformation to provide 1D integral images used for the region matching by the region matching unit of the apparatus onboard the object.

4. The method according to claim 1, wherein the extracted global motion parameters of said moving object, extracted by the region matching unit of the apparatus onboard the object, comprise a translation and a rotation of the moving object.

5. The method according to claim 1, wherein a motion of a feature on a top view image is decomposed, by the region matching unit of the apparatus onboard the object, into a sum of a global translation vector estimated from a large top view region and a local translation vector estimated from a small region around the respective feature.

6. The method according to claim 1, wherein the top view image is formed, by the generation unit of the apparatus onboard the object, by a metric top view image of the surface constructed by a regular grid with a predetermined distance between samples on the surface and by projecting each sample into a camera image to obtain a pixel value.

7. The method according to claim 1, wherein the global motion parameters are computed, by the region matching unit of the apparatus onboard the object, from a set of inliers provided by said region matching and selected by an estimator.

8. The method according to claim 1, wherein the object is a vehicle moving on a flat surface.

9. An apparatus for estimation of ego motion of an object moving on a surface comprising
at least one onboard video camera attached to said object adapted to provide video frames of the surface;
a generation unit adapted to generate composite top view images of the surface on the basis of video frames;
a region matching unit adapted to perform a region matching between consecutive top view images to extract global motion parameters of said moving object; and
a calculation unit adapted to calculate the ego motion of said moving object from the extracted global motion parameters of said moving object.

10. The apparatus according to claim 9 further comprising a transformation unit adapted to perform a 1D integral transformation of the top view images to provide 1D integral images stored in a buffer to be used for the region matching by said region matching unit.

11. The apparatus according to claim 9, wherein the global motion parameters are computed from a set of inliers provided by said region matching performed by said region matching unit and selected by an estimator.

12. The apparatus according to claim 11, wherein the estimator is a RANSAC estimator.

13. The apparatus according to claim 9, wherein the onboard video cameras are monocular cameras.

14. A vehicle moveable on a surface comprising an apparatus according to claim 9.

15. The vehicle according to claim 14, wherein the vehicle comprises a car moving on a road surface or a robot moving on a flat surface.

* * * * *